United States Patent
Tran et al.

[11] Patent Number: 6,142,729
[45] Date of Patent: Nov. 7, 2000

[54] SEALING DEVICE FOR A TURBOMACHINE BEARING CHAMBER

[75] Inventors: Hung Quac Tran, Liege; Lorenzo Pacchioni, Roclenge S/Geer, both of Belgium

[73] Assignee: Techspace Aero, Milmort Herstal, Belgium

[21] Appl. No.: 09/335,527

[22] Filed: Jun. 18, 1999

[30] Foreign Application Priority Data

Jun. 26, 1998 [EP] European Pat. Off. .............. 98202143

[51] Int. Cl.$^7$ ...................................... F01D 11/00
[52] U.S. Cl. .................. 415/113; 415/174.2; 415/174.5; 415/231
[58] Field of Search ..................... 415/111, 112, 415/113, 174.2, 174.5, 229, 231; 277/369, 384, 352, 377, 379, 390, 396, 400, 914

[56] References Cited

U.S. PATENT DOCUMENTS

| | | |
|---|---|---|
| 3,122,374 | 2/1964 | McGahan . |
| 3,921,986 | 11/1975 | Geary et al. ............................. 277/83 |
| 4,398,730 | 8/1983 | Rücker et al. . |
| 4,406,466 | 9/1983 | Geary, Jr. ............................. 277/96.1 |
| 4,687,346 | 8/1987 | Suciu . |
| 5,174,584 | 12/1992 | Lahrman ................................. 277/74 |
| 5,593,165 | 1/1997 | Murray et al. ........................... 277/22 |

FOREIGN PATENT DOCUMENTS 0 387 122 A1  9/1990  European Pat. Off. .
0 562 895 B1  9/1993  European Pat. Off. .

*Primary Examiner*—Edward K. Look
*Assistant Examiner*—Ninh Nguyen
*Attorney, Agent, or Firm*—Oblon, Spivak, McClelland, Maier & Neustadt, P.C.

[57] ABSTRACT

A sealing device for a turbomachine bearing chamber in which a bearing is mounted between a sleeve secured to a rotary shaft and a casing defining said bearing chamber, said sealing device comprising a labyrinth seal disposed on the sleeve at the junction with an adjacent air chamber, a static carbon ring which is not in contact with the shaft and is retained axially in position in a fixed annular support, and a rotary ring which is driven by the sleeve and which is centred without clamping on the sleeve by means of a ring seal and is retained axially in position by a flat annular spring, the rotary ring having a radial surface which faces and co-operates with a radial surface of the carbon ring and which is formed with lift grooves such that, during operation, a substantially frictionless sealing is effected between the two radial surfaces.

7 Claims, 5 Drawing Sheets

1

SEALING DEVICE FOR A TURBOMACHINE BEARING CHAMBER

BACKGROUND OF THE INVENTION

1. Field of the invention

The invention relates to a device for sealing a turbomachine bearing chamber.

Conventionally a turbomachine bearing assembly supporting a shaft which rotates within a fixed casing comprises a rolling bearing disposed in a chamber enabling it to be lubricated. However, oil migration to certain compartments of the turbomachine must be avoided and a seal is therefore necessary at the separation between the oil-containing bearing chamber and an adjacent air chamber which must be kept oil-free.

2. Summary of the prior art

Various solutions to this problem have been proposed. For example, labyrinth seals have been used and have the advantage of being simple to manufacture and of having a long working life. However, they may give rise to substantial air leakage, which impairs performance, and untrue running of the shaft may cause damage. There is therefore an increase in the amount of oil carried by the air to the air-oil separator and it is possible for oil to leak from the oil chamber into the air chamber.

Other solutions to the problem use carbon seals which can be positioned in various ways. In particular, EP-A-0387122 discloses one example of a segmented radial seal, and EP-A-0562895 discloses another example. The use of contact seals greatly reduces air leakage into the oil chamber and, in consequence, the oil consumption after passage through an oil separator. However, the effects of untrue running of the shaft are not overcome and there is considerable friction causing wear, so that seals of this kind have a limited working life which is often of the order of a thousand hours and inadequate for the uses intended for this invention.

SUMMARY OF THE INVENTION

It is an object of the invention to avoid the various disadvantages of the known solutions discussed above while providing the required sealing between an air chamber and a oil chamber.

Accordingly, the invention provides a sealing device for a bearing chamber in a turbomachine wherein a sleeve is rigidly secured to a rotary shaft and a rolling bearing is mounted between said sleeve and a casing defining an oil chamber in which said rolling bearing is located, said sealing device separating said oil chamber from an air chamber of said turbomachine and comprising:

- a labyrinth seal mounted on a portion of said sleeve which is disposed adjacent said air chamber;
- a static carbon ring having no contact with said shaft;
- a fixed annular support on which said static carbon ring is axially located;
- a first radial surface on said static carbon ring;
- a rotary ring connected to said sleeve so as to rotate therewith;
- a seal centering said rotary ring on said sleeve without clamping;
- annular spring means for retaining said rotary ring axially in position on said sleeve;
- and a second radial surface on said rotary ring facing and co-operating with said first radial surface on said static carbon ring;
- said second radial surface being provided with lift grooves whereby, during operation, a substantially frictionless sealing is effected between said first and second radial surfaces.

The sealing device in accordance with the invention enables the required objectives to be obtained. In particular, air leakage from the air chamber to the oil chamber is very reduced, so that oil consumption can be controlled and there is no adverse affect on performance. Oil leakage from the oil chamber to the air chamber is prevented and there is no pollution of the air used for the aircraft ancillaries. Since friction is avoided, heating of the seals and the resulting damage and/or wear are obviated. Seal life is therefore increased considerably. Also, the device is not affected by possible untrue running of the shaft.

Other features and advantages of the invention will become apparent from the following description of preferred embodiments of the invention with reference to the accompanying drawings.

DESCRIPTION OF THE PREFERRED EMBODIMENTS

Figure 1:
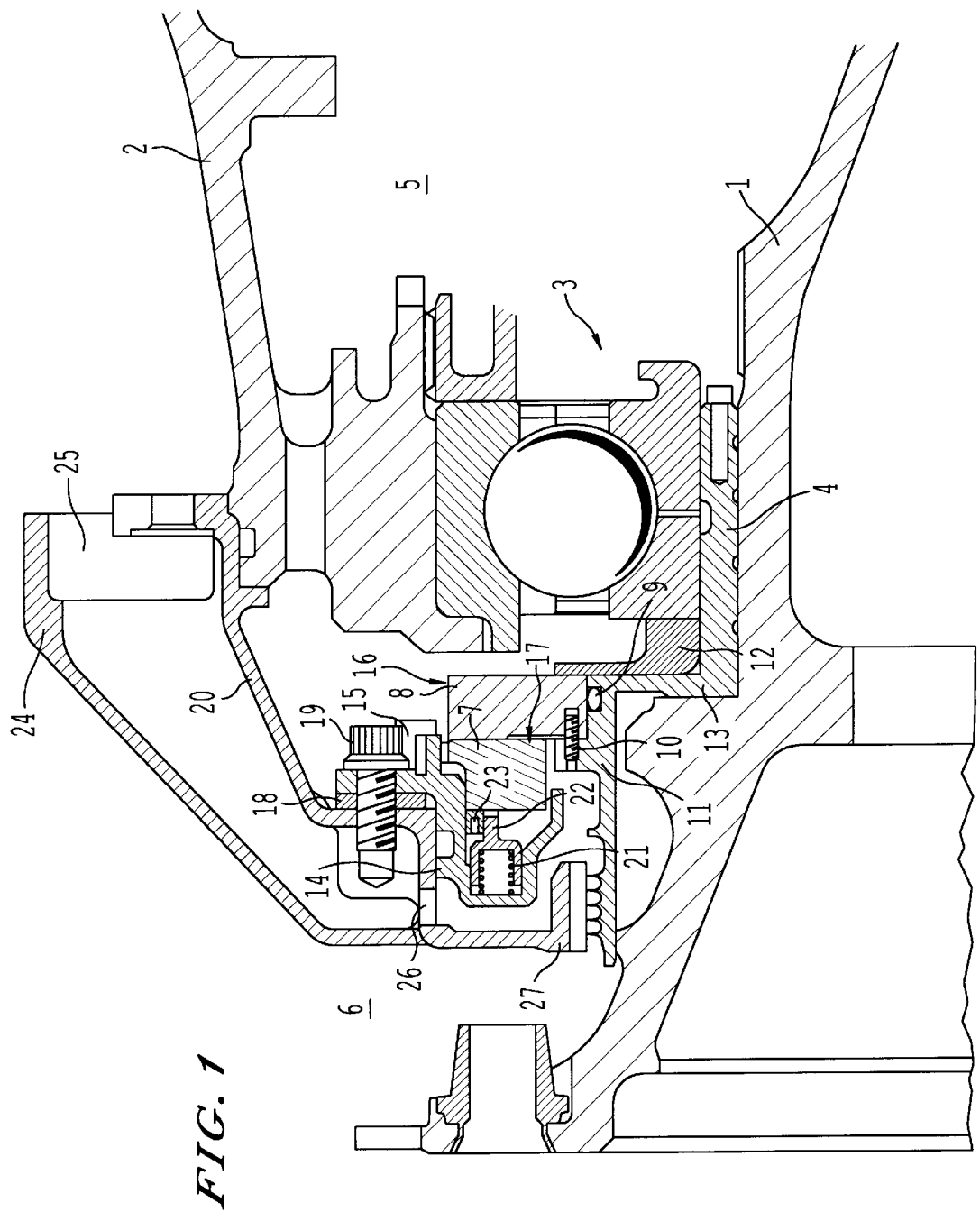
FIG. 1 is an axial sectional view of part of a turbomachine shaft bearing provided with one embodiment of a chamber sealing device in accordance with the invention.

Referring to FIG. 1, a shaft 1 is rotatably mounted in a bearing which is carried by a casing 2 and which comprises a rolling bearing 3, a sleeve 4 rotationally fixed to the shaft 1 being interposed between the rolling bearing 3 and the shaft 1 by means which are known per se in turbomachines. The rolling bearing 3 is housed in a chamber 5 in which both air and oil are present due to lubrication of the rolling bearing 3, the lubrication being provided in manner known per se and not being shown in detail in the drawings. In turbomachines to which this invention relates, the shaft 1 is surrounded beyond the bearing support by an air chamber 6 which must remain oil-free, since any entry of oil into certain compartments of the machine would impair satisfactory operation. Also, various air bleeds which are taken for aircraft ancillaries in a known manner call for the use of air which is clean and, in particular, oil-free if it is not to aggravate pressurisation and filtering problems. The sealing device in accordance with the invention is therefore disposed between the shaft 1 and the casing 2 at the separation between the oil chamber 5 and the air chamber 6.

Figure 2:
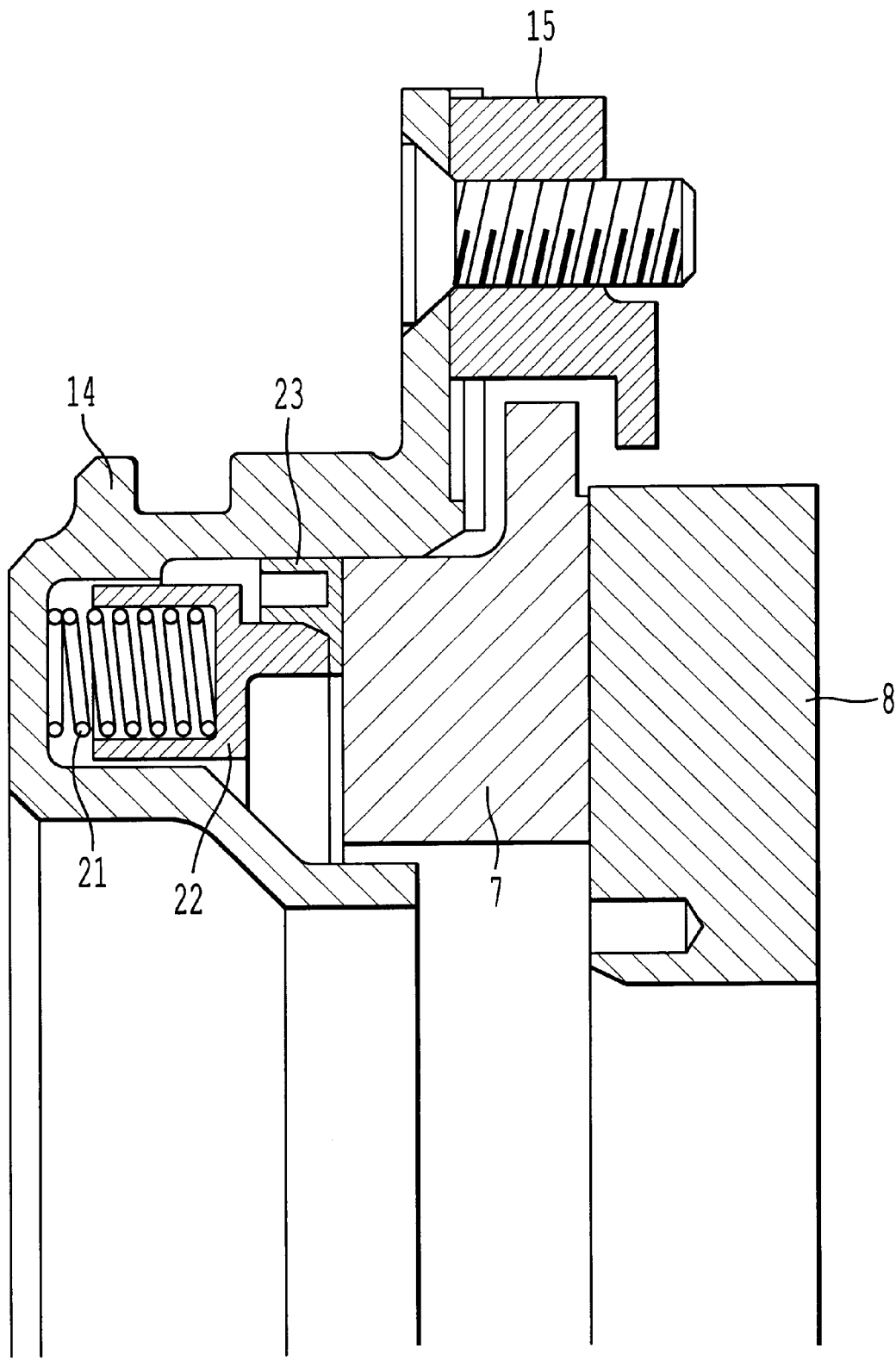
FIG. 2 is a view of a detail of FIG. 1 showing the arrangement of part of the sealing device to a larger scale.
Figure 3:
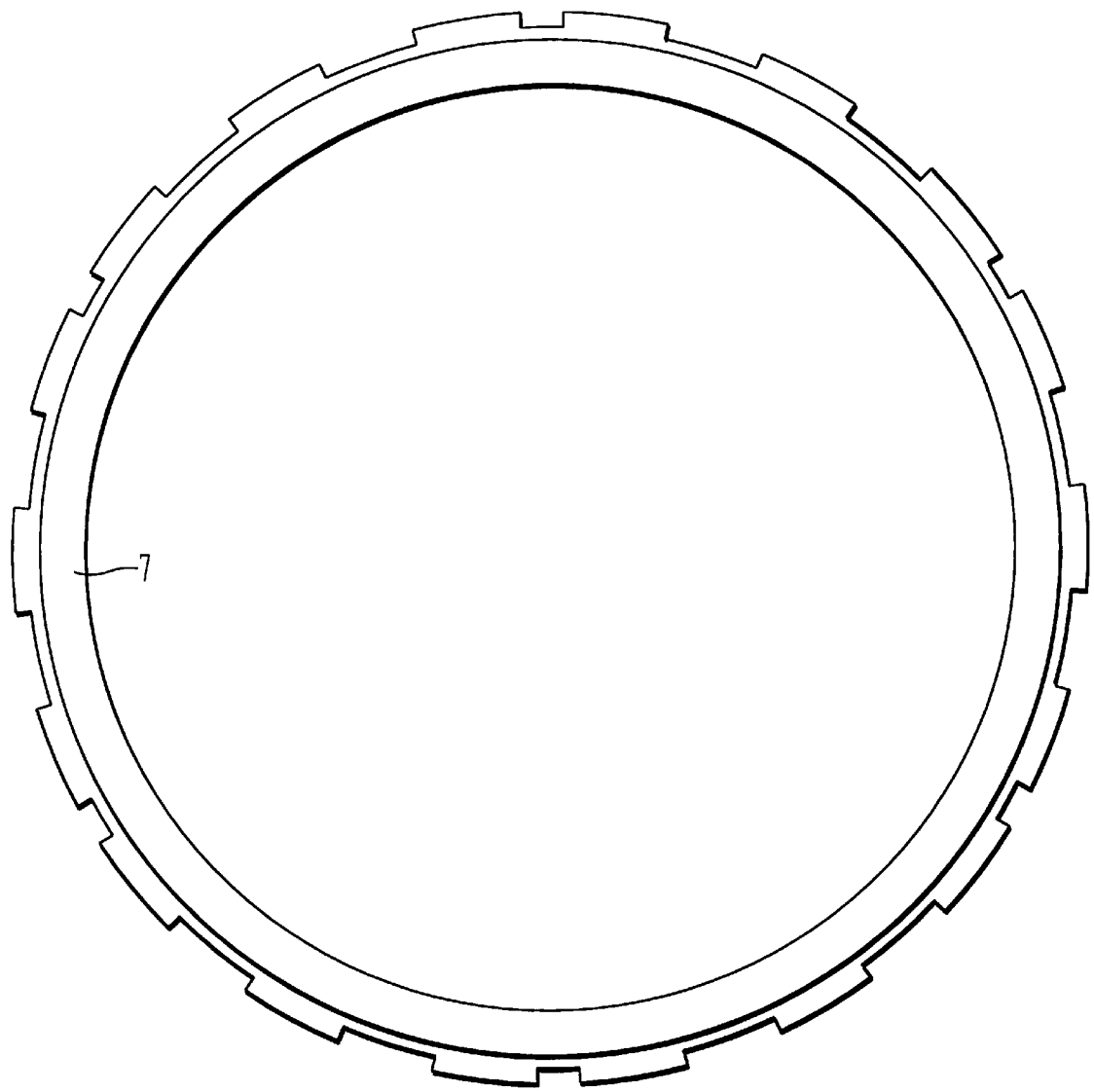
FIG. 3 shows a face view of the static carbon ring of the sealing device.
Figure 4:
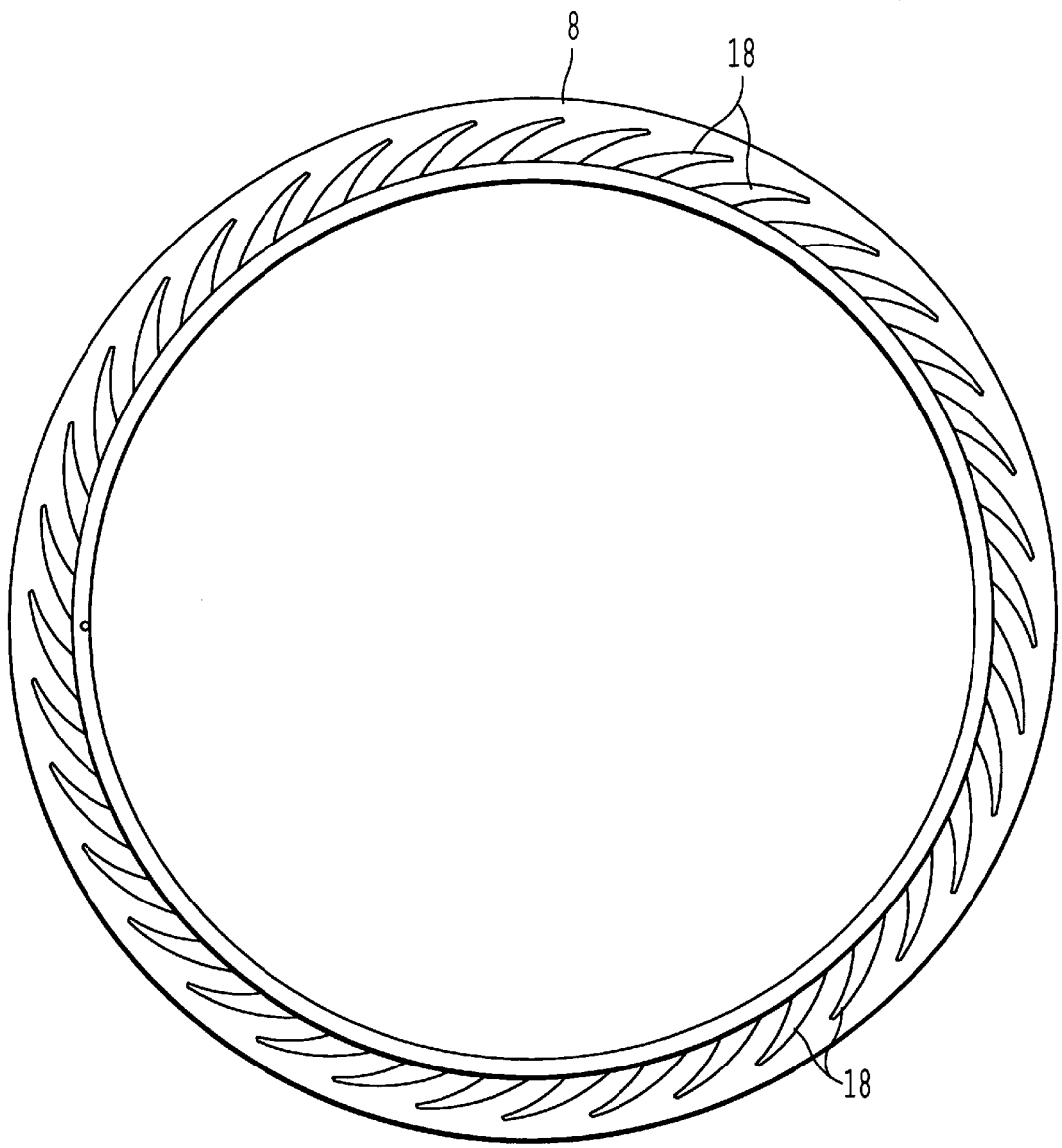
FIG. 4 shows a face view of the rotary ring of the sealing device.

Sealing is mainly provided by a seal consisting of a static carbon ring 7 associated with a rotary ring 8, the constructional details of which are shown in FIGS. 2, 3 and 4.

The rotary ring 8 is centred without clamping on the sleeve 4 by means of a ring seal 9, and is driven by the sleeve 4 by way of pins 10 housed in an edge 11 of the sleeve 4. The rotary ring 8 is held axially in position against the sleeve edge 11 by a flat annular spring 12 disposed between the rolling bearing 3 and a shoulder 13 of the sleeve 4. The carbon ring 7 is held in a fixed annular support 14 which envelopes it, and an axial blocking system 15 retains the carbon ring 7 in the free state in the support 14.

The sealing action occurs between the respective co-operating radial surfaces 16, 17 of the carbon ring 7 and the rotary ring 8. Lift grooves 18 are provided in the surface 17 of the rotary ring 8 so that, in operation, there is no appreciable friction between the facing surfaces 16, 17 of the rings 7 and 8. Instead, a minimal clearance is maintained such that a controlled minimum leakage of pressurised air is allowed from the air chamber 6 into the oil chamber 5 while preventing any flowback of oil from the oil chamber 5 to the air chamber 6.

An adjusting spacer 18 which is held by screws 19 between the support 14 of the carbon ring 7 and an element 20 of the casing 2 locates the carbon ring 7 axially relative to the rotary ring 8. Also, axial springs 21 are disposed within the support 14, being retained by a ring 22 on which the springs 21 act to exert an axial loading on the carbon ring 7 so as to prevent any leakage in the free state. In the embodiment shown in FIGS. 1 and 2 a secondary seal 23 in the shape of a laterally inverted F is interposed between the ring 22 and the carbon ring 7.

A cover 24 secures the static part of the sealing device to the casing 2 of the turbomachine. Air pressurisation ducts are secured to the cover 24 by way of a connection 25, and oil recovery ducts are connected to the cover 24 at 26. The cover 24 also carries the static part of a labyrinth seal 27 which is disposed on the sleeve 4 at the junction with the air chamber and which keeps out dust which might upset the sealing effect at the interface between the carbon ring 7 and the rotary ring 8.

The details of the invention hereinbefore described provide the advantageous results previously mentioned, and operational testing has shown that the resulting sealing is completely effective and the elements of the device operate satisfactorily as a whole.

Observations have confirmed that there is very low oil consumption at the oil separators, very reduced air leakage, zero oil leakage, and zero wear at the interface of the carbon ring 7 and rotary ring 8. These advantageous results are attributed to the following features of the arrangement in accordance with the invention:

Equilibrium of pressures around the carbon ring 7;

the very low level of friction acting on the carbon ring 7;

the absence of deformation of the rotary ring 8;

the correctly calibrated leakage clearance at the interface between the carbon ring 7 and the rotary ring 8 so as to avoid friction while providing the necessary minimum air leakage;

the creation of an air film at a localized positive pressure between the carbon ring 7 and the rotary ring 8; and the advantageous coupling between the air pressurisation and oil recovery systems, the provision of an additional labyrinth seal, and the particular features of the mounting and adjustment of the carbon ring and rotary ring forming the sealing device.

Figure 5:
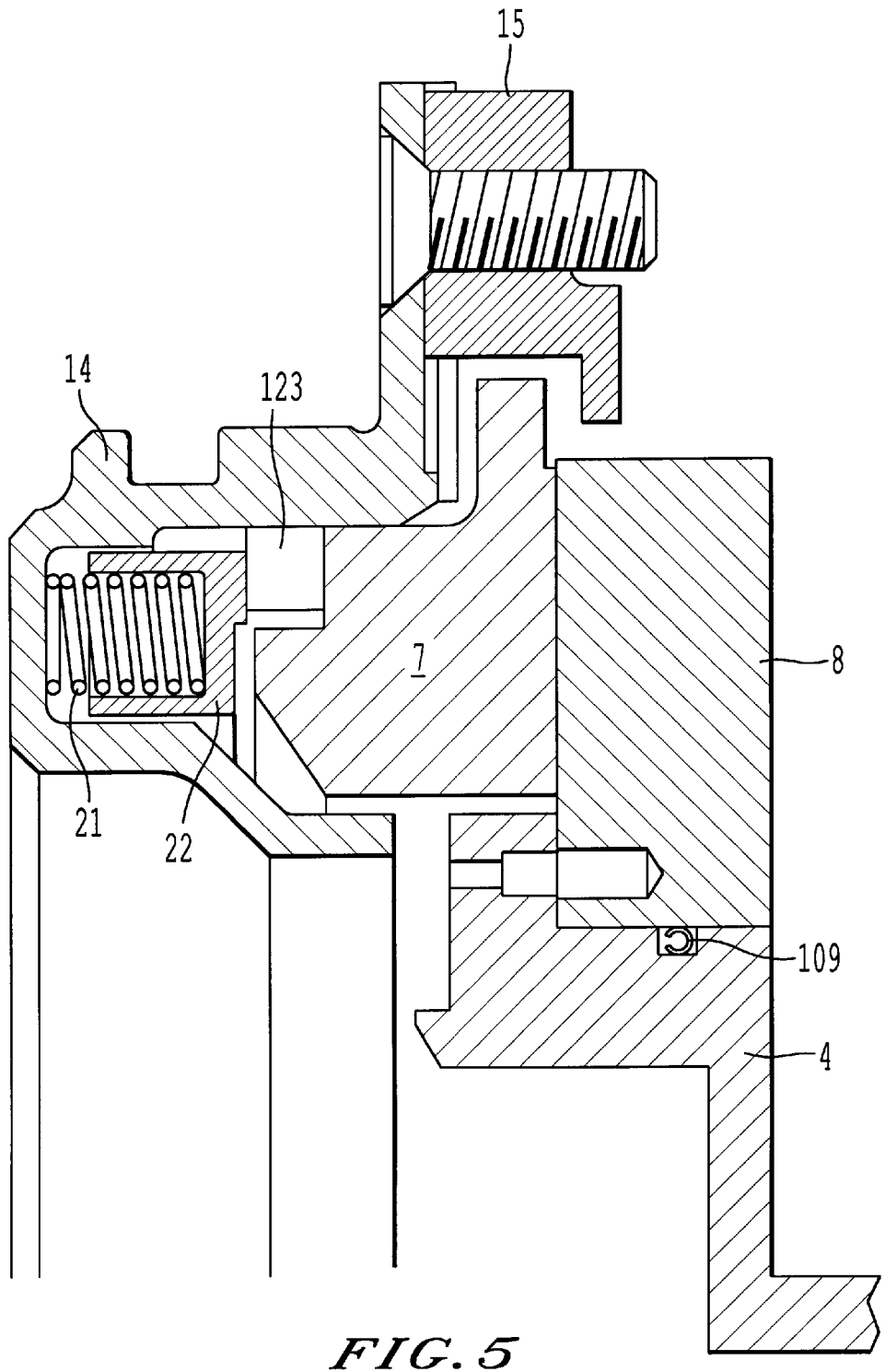
FIG. 5 is a view similar to FIG. 2 but showing an alternative embodiment.

If in particular applications the sealing device in accordance with the invention may be subjected to high temperatures and, in particular, to temperature variations from −60° C. to +500° C., some constructional variants are preferably used. In particular, and as shown in FIG. 5, the ring seal 9 used to centre the rotary ring 8 is preferably replaced by a resilient seal, such as a segmented C-section metal seal 109, which can take up clearance and withstand these temperatures. Also as shown in FIG. 5, at these temperatures the secondary seal 23 between the retaining ring 22 and the carbon ring 7 is preferably replaced by one or two segmented carbon rings 123.

What is claimed is:

1. A sealing device for a bearing chamber in a turbomachine wherein a sleeve is rigidly secured to a rotary shaft and a rolling bearing is mounted between said sleeve and a casing defining an oil chamber in which said rolling bearing is located, said sealing device separating said oil chamber from an air chamber of said turbomachine and comprising:

a labyrinth seal mounted on a portion of said sleeve which is disposed adjacent said air chamber;

a static carbon ring having no contact with said shaft;

a fixed annular support on which said static carbon ring is axially located;

a first radial surface on said static carbon ring;

a rotary ring connected to said sleeve so as to rotate therewith;

a seal centering said rotary ring on said sleeve without clamping;

annular spring means for retaining said rotary ring axially in position on said sleeve;

and a second radial surface on said rotary ring facing and co-operating with said first radial surface on said static carbon ring;

said second radial surface being provided with lift grooves whereby, during operation, a substantially frictionless sealing is effected between said first and second radial surfaces.

2. A sealing device according to claim 1, wherein said centering seal for said rotary ring is a resilient seal adapted for the take-up of clearance and able to withstand temperatures of from −60° C. to +500° C.

3. A sealing device according to claim 1, wherein an axial blocking system is provided for retaining said static carbon ring in the free state in said fixed annular support.

4. A sealing device according to claim 1, wherein an adjusting spacer is disposed between said fixed annular support and an element of said casing for setting the position of said static carbon ring axially relative to said rotary ring.

5. A sealing device according to claim 1, wherein axial springs are disposed in said fixed annular support and act on a thrust ring to exert an axial loading on said static carbon ring, and a secondary seal is interposed between said thrust ring and said carbon ring.

6. A sealing device according to claim 5, where said secondary seal between said thrust ring and said carbon ring consists of at least one segmented carbon ring and is capable of withstanding temperatures of from −60° C. to +500° C.

7. A sealing device according to claim 1, wherein said casing is provided with a cover, and pressurising air ducts and oil recovery ducts are secured to said cover.

* * * * *

UNITED STATES PATENT AND TRADEMARK OFFICE
CERTIFICATE OF CORRECTION

PATENT NO. : 6,142,729
DATED : November 7, 2000
INVENTOR(S): Hung Quac TRAN et al.

It is certified that an error appears in the above-identified patent and that said Letters Patent is hereby corrected as shown below:

Column 2, line 61, change "centred" to --centered--;

Column 3, line 9, change "pressurised" to --pressurized--;

line 24, change "pressurisation" to --pressurization--;

line 54, change "pressurisation" to --pressurization--;

Column 4, line 58, change "pressurising" to --pressurizing--.

Signed and Sealed this

First Day of May, 2001

Attest:

NICHOLAS P. GODICI

*Attesting Officer*   *Acting Director of the United States Patent and Trademark Office*